April 3, 1945.  A. G. NASH  2,372,974
CAMERA SHUTTER OPERATING MECHANISM
Filed Oct. 28, 1941  3 Sheets-Sheet 2
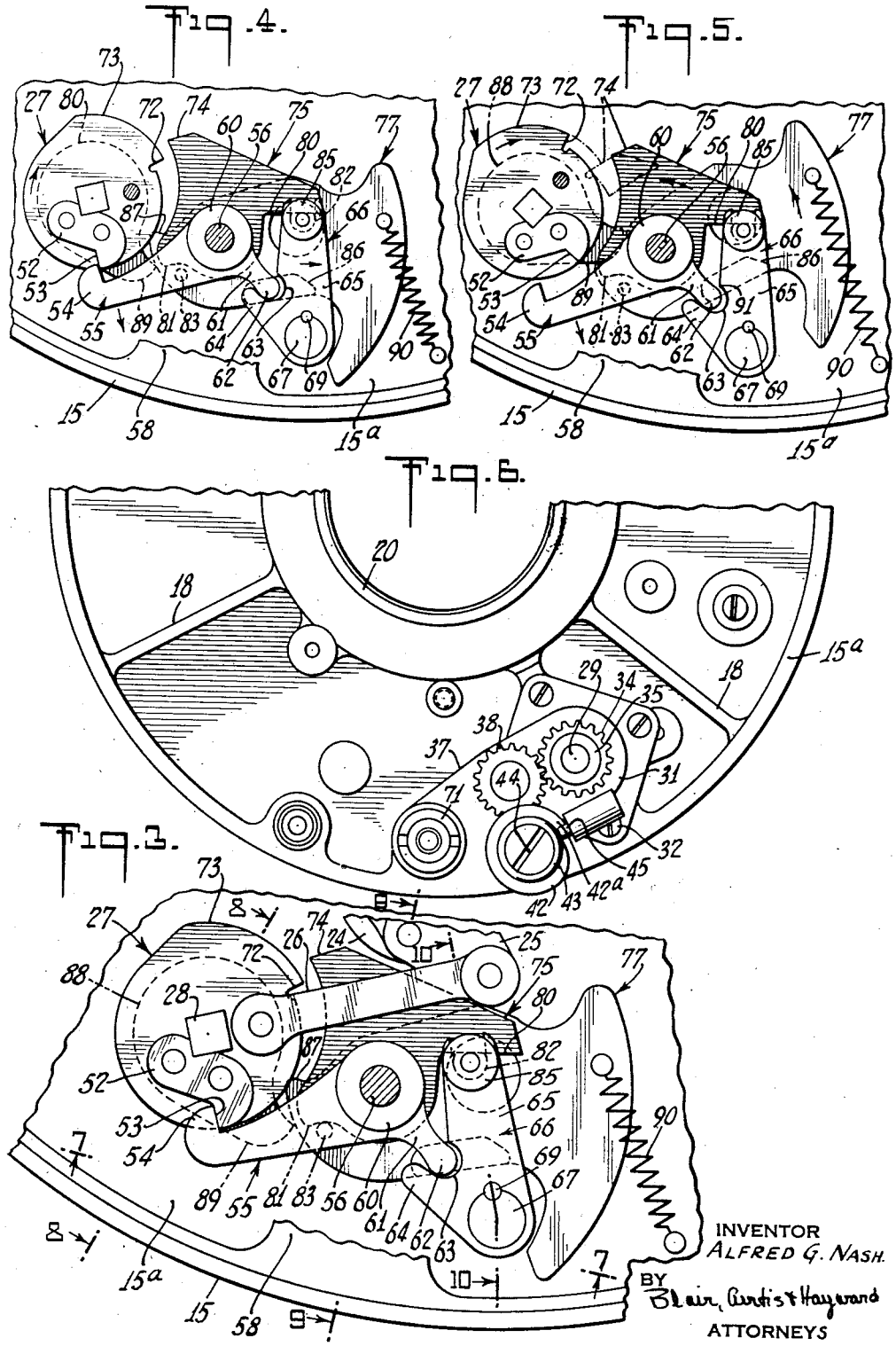
INVENTOR
ALFRED G. NASH.
BY
Blair, Curtis & Hayward
ATTORNEYS

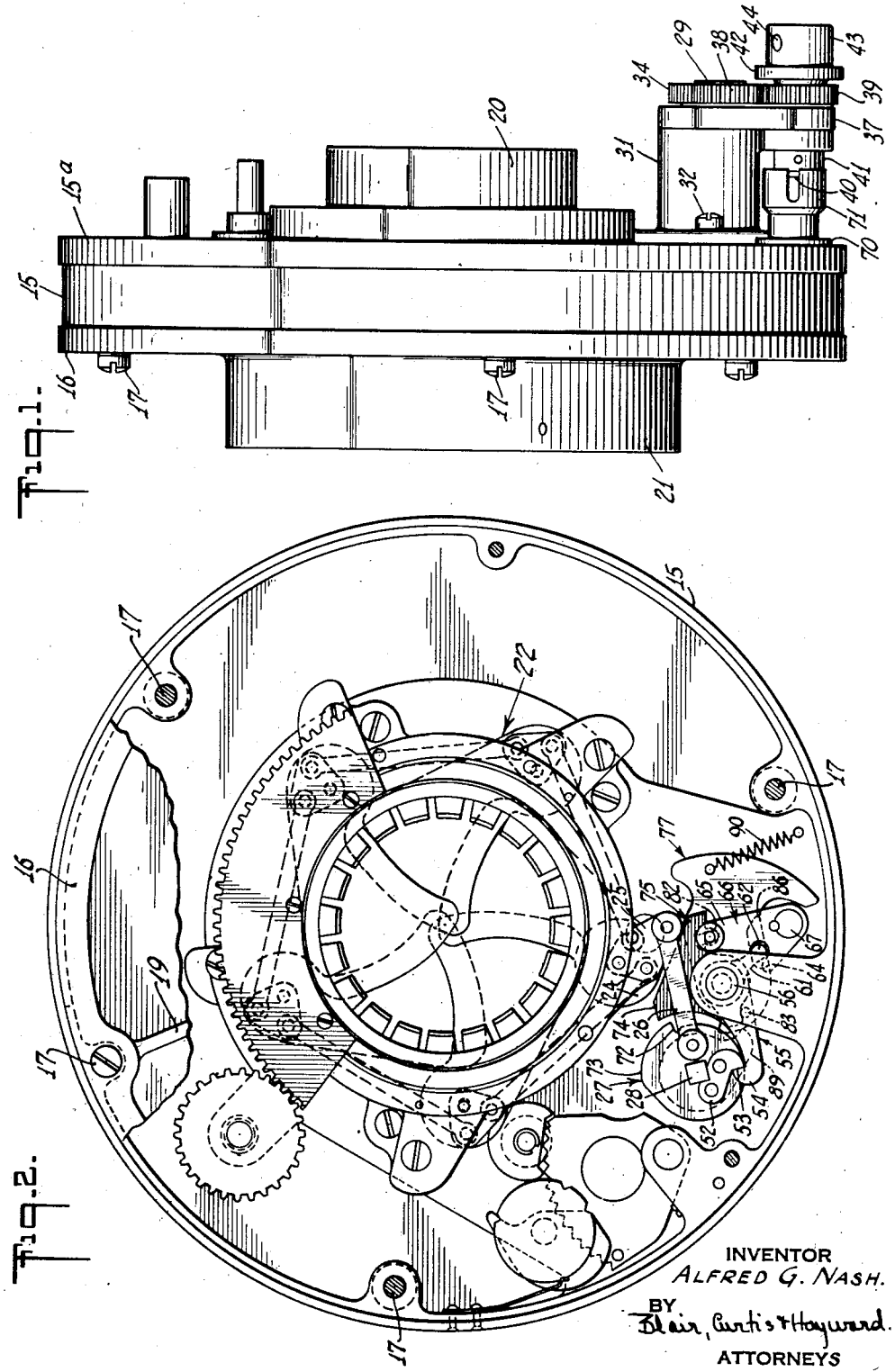

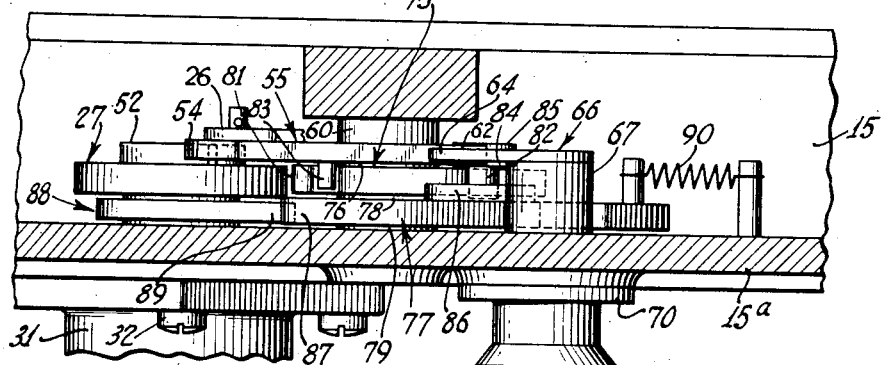
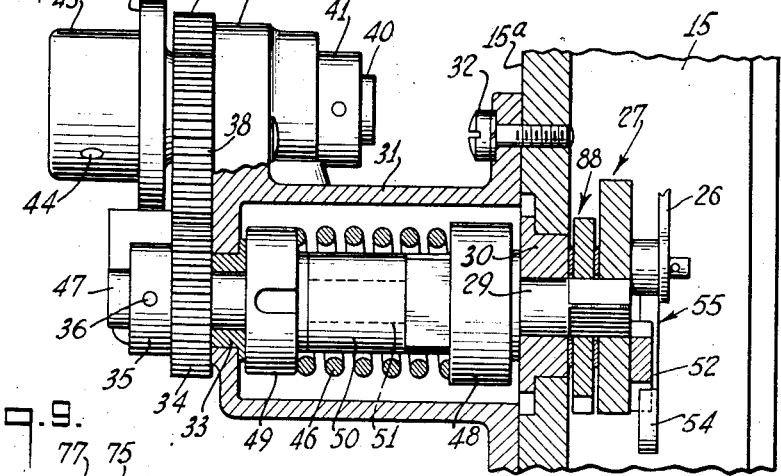
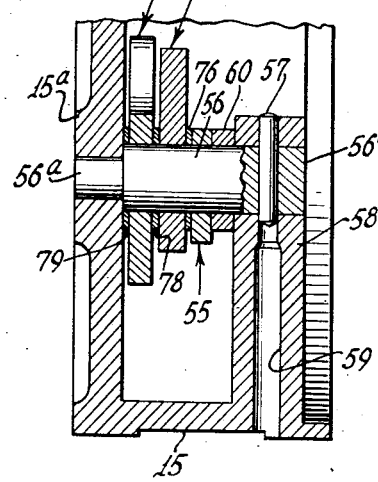
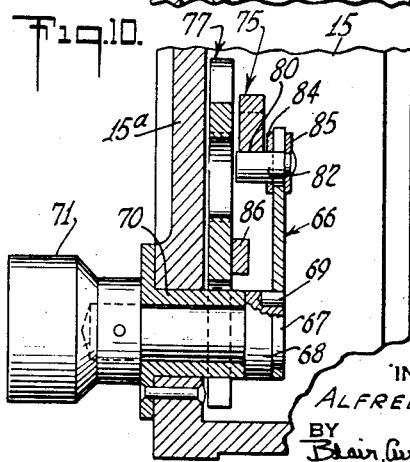

Patented Apr. 3, 1945

2,372,974

UNITED STATES PATENT OFFICE 2,372,974

CAMERA SHUTTER OPERATING MECHANISM

Alfred G. Nash, Richmond Hill, N. Y., assignor to Fairchild Camera and Instrument Corporation, a corporation of Delaware Application October 28, 1941, Serial No. 416,821

13 Claims. (Cl. 95—63)

This invention relates to photographic shutters of the so-called "between the lens" type, such as are used on aerial cameras.

The rise in speed of aircraft, and the development of fast film for aerial photography make necessary high shutter speeds for the production of sharp negatives. Also high speed lenses of substantial aperture increase the coverage requirement for shutters. However, high shutter speeds of reliable accuracy are difficult to attain in shutters, other than the focal plane type, for speeds in excess of 1/250 second, and apertures up to 2⅜ inches in diameter.

Where a shutter of this size is used, the operating parts thereof are much heavier in proportion than the parts of small shutters of like design, hence the inertia forces to which such parts are subjected result in greater than proportionate increases in stress. High-speed operation of the heavy shutter operating parts results in the creation of considerable momentum, and accordingly, problems arise in endeavoring to absorb this momentum so that the shutter parts are brought to a stop at the proper times during the operation cycle. Shutter mechanisms which depend upon spring action inertia or friction for proper operation are not reliable when subjected to more severe conditions.

Although substantial in size, shutters for aerial cameras are, in many respects, as sensitive as small shutters such as used on amateur cameras, but unlike such small shutters, are subject to varying atmospheric exposure, low temperatures, and often considerable vibration transmitted through the camera from the airplane on which it is mounted. Unless the shutter operating mechanism can cope with these conditions with uniform and lasting efficiency, varying exposure times result and cause unsatisfactory photographic effects.

It is accordingly among the objects of this invention to provide a shutter of simple and durable construction, and in which positive control at high shutter speeds may be effected. Another object is to provide a shutter of this nature capable of efficient operation under the conditions outlined above. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawings, in which is shown one embodiment of my invention;

Figure 1 is an elevation of my shutter;

Figure 2 is a plan view from the bottom of Figure 1 with the front cover partially broken away to show the enclosed mechanism;

Figure 3 is an enlarged fragmentary view of a portion of the mechanism shown in Figure 2, showing the operating parts in one of their operative positions;

Figure 4 is a smaller view similar to Figure 3, showing the parts in another of their operating positions;

Figure 5 is a view similar to Figure 4, but showing the parts in still another of their operative positions;

Figure 6 is a fragmentary top plan view of the shutter shown in Figure 1;

Figure 7 is a section taken along the line 7—7 of Figure 3;

Figure 8 is a section taken along the line 8—8 of Figure 3;

Figure 9 is a section taken along the line 9—9 of Figure 3; and,

Figure 10 is a section taken along the line 10—10 of Figure 3.

Similar reference characters refer to similar parts throughout the various views of the drawings.

Referring first to Figure 1, the shutter comprises a housing 15 generally of the form of a flat cylindrical cup, within which the operative parts of the shutter are mounted, as shown in Figure 2. A front cover 16 is secured to housing 15 as by screws 17, and when this cover is secured in place on the housing, the mechanism in the housing is enclosed therein, and accordingly protected thereby. It will also appear that the operating mechanism in casing 15 is readily accessible for repair, replacement or adjustment, simply through the removal of cover 16. Preferably the rear wall 15a, as well as cover 16 of housing 15, are provided respectively with stiffening webs 18 (Figure 6) and 19 (Figure 2). Thus, the rear wall and cover may be made of thin, light metal, and yet be capable of providing ample support for the operating mechanism of the shutter enclosed therebetween. As shown in Figure 1, housing 15 and cover 16 have respectively formed thereon lens mounts 20 and 21, in which suitable lenses may be installed as desired.

As shown in Figure 2, housing 15 includes supporting structure for the shutter blades, generally indicated at 22, as well as an iris diaphragm, generally indicated at 23. As neither the shutter blades nor the diaphragm, nor the character of their mounting is involved in my present invention, it will suffice to say that the diaphragm may be of a conventional character, and the shutter blades 22 may be of the general type shown in United States Letters Patent 1,626,032 to Sherman M. Fairchild. As is customary in shutter blades of the type of blades 22, the blades are individually mounted on pivotable members 100, and are interconnected one with another by suitable links 101 so that one of the pivotable members 100 and accordingly one of the blades may be actuated to operate all of them. Thus the end of one of the pivotable members 101 is shown at 24 in Figure 2, and has connected thereto a lug 25 to which is pivotally connected one end of a link 26.

As is more clearly shown in Figure 3, the other end of link 26 is pivotally connected to a crank disc, generally indicated at 27, which is mounted on the squared end 28 of a shaft 29. Shaft 29 is journaled in a bushing 30 mounted in housing wall 15a, and extends upwardly through a winding spring housing 31, which is secured to housing wall 15a as by screws 32. Another shaft 47 is journaled in a bushing 33 mounted in the top of winding spring housing 31, and carries on its outer end a gear 34, the hub 35 of which is pinned to the shaft as by a pin 36. The upper end of shaft 29, and the lower end of shaft 47, have respectively secured thereto collars 48 and 49 held in spaced relation by a spacer 50 mounted about an idler shaft 51. A torsion spring 46 is disposed between collars 48 and 49 about spacer 50, and has its opposite ends secured respectively to collars 48 and 49. Thus assuming that shaft 29 and accordingly collar 48 are held against rotation, shaft 47 and accordingly collar 49 may be rotated to load spring 46, so that upon release of shaft 29, as will be pointed out hereinafter, this shaft is rotated by the spring to drive crank disc 27.

Winding spring housing 31 is provided with a laterally extending web or projection 37 on which an idler gear 38 is rotatably mounted. This gear 38 meshes with gear 34, and also with a gear 39 secured to a winding shaft 40 rotatably mounted in housing extension 37. A collar 41 is pinned to the lower end of shaft 40, while to the upper end of the shaft is secured a stop cam 42 and a winding coupling 43, in which is secured a pin 44 (Figure 6) adapted to receive a detachable coupling for a suitable winding cable or the like (not shown). It will now appear that when such a winding cable is secured to coupling 43 and rotated counterclockwise, as viewed in Figure 6, cam stop 42 is likewise rotated until a stop 42a formed thereon rides over a spring biased detent 45, which snaps outwardly into the low portion of the cam stop and prevents counterclockwise movement of the cam stop under the bias of spring 46 (Figure 8). Thus spring 46 is loaded.

As coupling 43 is rotated, gears 39, 38 and 34 are also rotated to tension spring 46 and thus load the spring. As noted above, cam stop 42 holds the spring wound. Thus, the spring is conditioned to rotate collar 48 and accordingly shaft 29 upon release of crank disc 27.

As noted above, crank disc 27 (Figure 3) is connected to link 26. Hence, when the crank disc is released, as will be described below, spring 46 (Figure 8), assuming that the spring is loaded, spins crank 27 (Figure 3) and accordingly reciprocates link 26 to operate shutter blade 25 and accordingly the other shutter blades.

Crank disc 27 has pinned thereto a locking plate 52 on which is formed a shoulder 53. Plate 52 and its shoulder 53 are, of course, under the bias of spring 46 (Figure 8) which tends to rotate crank disc 27 and accordingly the blade and shoulder clockwise, as viewed in Figure 3. This rotation of the crank disc is releasably restrained, however, by a hook 54 formed on the end of a bell crank generally indicated at 55, which is pivotally mounted on a stud shaft 56, one end 56a of which (Figure 9) is secured to housing wall 15a within housing 15. The other end 56b of shaft 56 is pinned as by a dowel pin 57 in a support 58 integrally formed on and extending inwardly from the periphery of housing 15. Support 58 is preferably drilled as at 59 to provide a knock-out hole to facilitate the removal of pin 57 when it is desired to remove stud shaft 56. Bell crank 55 is suitably spaced from support 58 by a spacer washer 60 mounted on shaft 56 between the bell crank and the support.

Referring back to Figure 3, it may be seen that bell crank 55 includes an arm 61 which extends away from shaft 56 to terminate in a lobe 62. Lobe 62 is loosely received in a cavity 63 formed between a projection 64 and an arm 65 of a lever generally indicated at 66. This lever is secured to the lower end of a shaft 67, as viewed in Figure 10, and rests against a collar 68 formed on the shaft. A pin 69 extends through lever 66 and into collar 68 to prevent relative movement between the lever and shaft 67. Shaft 67 is rotatably disposed within a bushing 70 extending through and secured to housing wall 15a, and has secured to its outer end a coupling 71 (see also Figures 6 and 7) to which may be detachably secured a shutter tripping cable or the like (not shown) so that the shutter mechanism may be remotely controlled. Thus, assuming that such a control cable is attached to coupling 71, and is operated so as to rotate the coupling, and accordingly shaft 67 clockwise, as viewed in Figure 3, lever 66 is also rocked clockwise. This movement of the lever forces projection 64 against lobe 62, which rocks bell crank 55 counterclockwise and retracts hook 54 from shoulder 53 on blade 52. The plate, and accordingly crank disc 27, are thereby released for spinning operation by spring 46, the crank disc being spun to operate the shutter blades until the disc is positively stopped by mechanism which will be described hereinafter. It accordingly appears that actuation of the shutter blades can only occur upon positive actuation of the shutter trip mechanism, which holds the shutter blade release parts against inadvertent operation from vibration or shock.

Inasmuch as shutter speeds up to 1/250 of a second and greater are necessary under certain circumstances, spring 46 (Figure 8) is accordingly sufficiently powerful that when tensioned it is capable of driving crank disc 27 (Figure 3), link 26 and the connected shutter blades at such high speeds. In view of the fact that these several parts must be relatively heavy, because of the substantial aperture of the camera lens (for example 2⅝ inches), I provide mechanism capable of absorbing the substantial momentum of these parts and positively bringing them to a stop so as to prevent total or partial double exposure, which might otherwise result through overrunning of the shutter operating parts, or rebound thereof, at the end of the operative cycle. To this end, and with reference to Figure 3, I provide a stop shoulder 72 on an enlarged peripheral portion 73 of crank disc 27, which engages a surface 74 of a shutter cam stop generally indicated at 75, which is moved into position to stop the movement of crank disc 27 by mechanism to be described.

As shown in Figure 9, shutter cam stop 75 is pivotally mounted on stud shaft 56, and is spaced from bell crank 55 by a spacing washer 76 so that the cam stop is movable relative to bell crank 55. Shaft 56 also has pivotally mounted thereon a snubber segment generally indicated at 77, this snubber segment being spaced from cam stop 75 by a spacer washer 78, and also being spaced from the inner surface of casing wall 15a by another spacing washer 79. Thus the snubber segment is movable about shaft 56 relative to cam stop 75.

Referring back to Figure 3, cam stop 75 includes a surface 80 and a lobe 81, the former of which is adapted to be engaged by a locking pin 82 slidably mounted in the bifurcated end of lever 66, and the latter of which is adapted to be engaged by a pin 83 secured to and extending from bell crank 55. As is more clearly shown in Figure 10, pin 82 has secured thereto a pair of washers 84 and 85 which embrace lever 66 and accordingly hold pin 82 in proper operative relationship thereto. The pin extends upwardly, as viewed in Figure 10, from lever 66, adjacent surface 80 of cam stop 75. A block 86 is secured to snubber segment 77, and upon operation of the snubber segment is adapted to engage lock pin 82 to force the lock pin against surface 80 of cam stop 75 to move the cam stop into its stopping position, as will be described in detail below.

Snubber segment 77 includes a lobe 87 (Figure 3) which is engaged by a cam generally indicated at 88, which is secured to crank disc 27. Cam 88 includes a lobe 89 which, when crank disc 27 and accordingly cam 88 have rotated approximately 315°, engages lobe 87 on snubber segment 77 to rock the snubber segment counterclockwise against the bias of a spring 90. As lobe 89 on cam 88 continues to ride against lobe 87 on snubber segment 77, the snubber segment is rocked until pin 82 (Figure 5) is engaged by block 86, as viewed in this figure, and the pin is forced upwardly against surface 80 on cam stop 75 so that further counterclockwise movement of snubber segment 77 moves stop surface 74 of the cam stop from the full to the dotted line position shown in Figure 5. When in the dotted line position, cam stop surface 74 lies in the path of shoulder 72 on crank disc 27, and accordingly prevents rotation of the crank disc beyond this point, thus positively bringing all the shutter blade operating parts to a dead stop.

From the above it may now be seen that when bell crank 55 (Figure 3) has been rotated counterclockwise by the clockwise rotation of trip lever 66, hook 54 on the bell crank disengages locking plate 52 and permits the shutter crank disc 27 to revolve under the bias of spring 46 and operate the shutter. The shutter crank disc turns freely through an angle of approximately 315°, after which the gradually rising face on retard cam 88, i. e., lobe 89, makes contact with lobe 87 on snubber segment 77. Lobes 89 and 87 are so contoured that snubber segment 77 accelerates evenly while retard cam 88 decelerates evenly, over an arc of approximately 30°.

During this 30° interval, the revolution of snubber segment 77 moves block 86 on the snubber segment into engagement with the locking pin 82 which, in turn, slides in its slot in trip lever 66 until it makes contact with surface 80 on cam stop 75. The force transmitted from snubber segment 77 to cam stop 75 by way of locking pin 82 drives the cam stop so as to force its stop surface 74 into the path of shoulder 72 on crank disc 27. The crank disc, which has lost most of its speed through the snubber action between cam 88 and snubber segment 77, is thus revolved to a position such that the stop face, i. e., shoulder 72, on crank disc 27, is within 5° of stop surface 74 on cam stop 75 which, as noted, has been driven into its path. Thus the shutter cam stop 75 stops shutter crank disc 27 after the latter has traveled about 345°, after which the mechanism is ready to be reset.

As noted above, bell crank 55 (Figure 3) has a pin 83 extending therefrom toward snubber segment 77. When bell crank 55 is in the position shown in Figure 5, and when stop surface 74 of cam stop 75 is in its dotted line position, pin 83 on the bell crank is in engagement with lobe 81 on cam stop 75. When the parts are in these positions, it follows that clockwise movement of bell crank 55 forces pin 83 against lobe 81 of cam stop 75, thus forcing its stop surface 74 out of engagement with stop shoulder 72 on crank disc 27. At the same time, of course, hook 54 is swung into the path of shoulder 53 on locking plate 52, and these parts are so proportioned and their movements are so timed that before cam stop 75 releases crank disc 27, bell crank hook 54 is in the path of movement of shoulder 53 of the locking plate. Thus the crank disc is positively locked against inadvertent shutter blade operation.

Hence, to reset the shutter operating mechanism, trip lever 66 is revolved in a counterclockwise direction, as viewed in Figure 5, pulling locking pin 82 from its locked position between block 86 and surface 80 on cam stop 75. At the same time, surface 91 on trip lever 66 engages lobe 62 of bell crank 55 to move the bell crank clockwise. As this movement progresses far enough to permit locking pin 82 to move clear of surface 80 on cam stop 75, the release pin 83 on bell crank 55 engages lobe 81 of cam stop 75, moving the cam stop, and accordingly its surface 74 out of engagement with stop shoulder 72 on crank disc 27. When the cam stop 75 has been moved far enough to disengage the shutter crank 27, hook 54 of bell crank 55 has moved into full position for catching shoulder 53 on locking plate 52. The still partially wound spring 46 (Figure 8) has sufficient tension to drive shutter crank 27 (Figure 3) the 15 degrees remaining of its full cycle of operation to place the shutter crank in its "ready to trip" position. Also, as the crank disc 27 moves its final 15 degrees in resetting, retard cam lobe 89 moves out of engagement with lobe 87 on snubber segment 77, permitting the snubber segment to be pulled back to its original position by spring 90.

It will now appear that all operations of the shutter operating mechanism are positively controlled. The shutter spring 46 (Figures 6 and 8) is positively locked in loaded condition; shutter crank disc 27 is positively held against the bias of its operating spring by the coacting portions of lock plate 52 and bell crank 55; the shutter crank disc 27 is positively released through the coaction of trip lever 66, bell crank 55 and lock plate 52; crank disc 27 is positively stopped by cam stop 75, which is positively moved into position through the engagement of retard cam 89 and snubber segment lobe 87; and resetting of crank disc 27 is positively effected without any possibility of release operation by reason of the timed releasing and locking movements of cam stop surface 74 and bell crank hook 54. Accordingly, if the shutter operating spring 46 should be inadvertently rewound before the shutter tripping mechanism has been reset, there is no danger that the shutter spring can be prematurely released prior to resetting of the trip mechanism, as tripping operation of trip lever 66 cannot be effected until after its resetting operation and, of course, resetting operation of trip lever 66 locks crank disc 27, as described above. In other words, regardless of the condition of the shutter operating spring, the shutter crank 27 is positively locked against inadvertent release.

Thus it will appear that the entire shutter operating mechanism is positive in operation and none of the several parts which control the opening and closing of the shutter depend for their operation on springs or inertia.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a photographic shutter, in combination, a plurality of blades movable outwardly and inwardly to open and close an exposure aperture, a rotatable crank disc, a link pivotally attached to and connecting said disc and said blades, whereby said blades are opened and closed upon rotation of said disc, means for retarding the rotation of said disc, and means operated by said retarding means for positively stopping further rotation of said disc beyond a predetermined point.

2. In a photographic shutter, in combination, a plurality of blades movable outwardly and inwardly to open and close an exposure aperture, a rotatable crank disc, means connected with said disc and said blades to transmit motion from the disc to the blades to move the blades between their open and closed position, a disc rotation retarding member associated with said disc and rotatable therewith, and movable snubber means engageable by said retarding member for retarding said disc, said retarding member and said snubber means having engageable cooperating formations thereon so configured as to effect uniform deceleration of said retarding member and accordingly said disc and uniform acceleration of said snubber means.

3. In a photographic shutter, in combination, a plurality of blades movable outwardly and inwardly to open and close an exposure aperture, a rotatable crank disc, means pivotally connected with said disc and said blades to transmit motion from the disc to the blades to move the blades between their open and closed position, a disc rotation retarding member associated with said disc and rotatable therewith, means engageable by said retarding member for retarding said disc, and means actuated by said last-mentioned means for positively stopping rotation of said disc at a predetermined point in its rotation.

4. In a photographic shutter, in combination, a plurality of blades movable outwardly and inwardly to open and close an exposure aperture, means including a rotatable crank disc for moving said blades between their open and closed positions, releasable locking means for holding said disc against blade actuating operation, means movable into and out of stopping position for positively stopping rotation of said disc at a predetermined point in its rotation short of its locked position, and means movable in response to movement of said stopping means out of its stopping position for resetting said locking means prior to complete movement of said disc stopping means from its disc stopping position.

5. Shutter operating mechanism for a plurality of shutter blades operable between open and closed position, said mechanism comprising, in combination, a casing, a shaft rotatably mounted in said casing, a crank disc secured to said shaft and connected to said blades to effect operation thereof upon rotation of the disc, a disc rotation retarding member secured to said shaft and rotatable therewith, a second shaft in said casing, a disc locking member pivotally mounted on said second shaft and releasably engageable with said disc for holding said disc against shutter blade operating rotation, a disc stopping member pivotally mounted on said second shaft and engageable with said disc at a predetermined point in the rotation thereof to positively stop said disc, a snubber member pivotally mounted on said second shaft and engageable by said disc retarding member, and means associated with said snubber member and said disc stopping member for moving said disc stopping member into a position to engage and stop said disc subsequent to engagement between said disc retarding member and said snubber member.

6. Shutter operating mechanism for a plurality of shutter blades operable between open and closed position, said mechanism comprising, in combination, a casing, a shaft rotatably mounted in said casing, a crank disc secured to said shaft and connected to said blades to effect operation thereof upon rotation of the disc, a second shaft in said casing, cooperating means associated with said shafts and with said disc for retarding rotation of said disc as it approaches the end of its blade operating movement, and a disc stopping member mounted on said second shaft and movable into disc stopping position by said means subsequent to the retarding action of said means.

7. Shutter operating mechanism for a plurality of shutter blades operable between open and closed position, said mechanism comprising, in combination, a casing, a shaft in said casing, a crank disc rotatably mounted on said shaft and connected to said blades to effect operation thereof upon rotation of the disc, a locking plate secured to said disc, a second shaft in said casing, a locking member pivotally mounted on said second shaft and releasably engageable with said locking plate to hold said disc against shutter operating rotation, a trip lever rockably mounted in said casing and engageable with said locking member to move said member out of locking engagement with said locking plate to permit rotation of said disc, means for stopping rotation of said disc at the end of its shutter operating movement, means movably mounted on said trip lever and engageable with said stopping means to move said stopping means into its disc stopping position, and means movable by said first-mentioned shaft for moving said movably mounted means into engagement with said stopping means.

8. Shutter operating mechanism for a plurality of shutter blades operable between open and closed position, said mechanism comprising, in combination, a casing, a crank disc rotatably mounted in said casing and connected to said blades to effect operation thereof upon rotation of the disc, a disc locking member rockably mounted in said casing and releasably engaging said disc, a disc stopping member rockably mounted in said casing and movable into disc stopping position to stop rotation of said disc at the end of its blade operating movement, means for resetting said disc locking member into locking position subsequent to its releasing movement, and means associated with said disc locking member for moving said disc stopping member out of its disc stopping position upon resetting operation of said disc locking member.

9. Shutter operating mechanism for a plurality of shutter blades operable between open and closed position, said mechanism comprising, in combination, a casing, a crank disc rotatably mounted in said casing and connected to said blades to effect operation thereof upon rotation of the disc, a disc locking member rockably mounted in said casing and releasably engaging said disc, a disc stopping member rockably mounted in said casing and movable into disc stopping position to stop rotation of said disc at the end of its blade operating movement, means for resetting said disc locking member into locking position subsequent to its releasing movement, and means associated with said disc locking member for moving said disc stopping member out of its disc stopping position upon resetting operation of said disc locking member, said means being so arranged with relation to said disc stopping member that said disc locking member is in disc locking position before said disc stopping member is removed from disc stopping position.

10. Shutter operating mechanism for a plurality of shutter blades operable between open and closed position, said mechanism comprising, in combination, a casing, a shaft rotatably mounted in said casing, a crank disc secured to said shaft and connected to said blades to effect operation thereof upon rotation of the disc, a disc rotation retarding member secured to said shaft and rotatable therewith, a second shaft in said casing, a member mounted on said second shaft and operatively associated with said disc for releasing said disc for shutter operation, another member mounted on said second shaft and operatively associated with said retarding member for retarding rotation of said disc subsequent to release thereof, and a third member mounted on said second shaft and operatively associated with said disc for positively stopping said disc at that point in its rotation wherein it has closed said shutter blades.

11. Apparatus according to claim 10 wherein there is provided a trip lever which is operatively associated with one of said members on said second shaft for tripping said one member to release said disc for shutter operating rotation.

12. Apparatus according to claim 10 wherein there is provided means for biasing one of said members on said second shaft into a position to be engaged by said retarding member during the rotation of said disc.

13. Apparatus according to claim 10 wherein there is provided a trip lever operatively associated with one of the members on said second shaft for tripping said one member to release said disc for shutter operating rotation, and means associated with another of said members on said second shaft and with said tripping lever for moving still another of said members on said second shaft into a position to stop rotation of said disc after it has closed said shutter blades.

ALFRED G. NASH.